US011921022B2

(12) United States Patent
Schuetz et al.

(10) Patent No.: US 11,921,022 B2
(45) Date of Patent: Mar. 5, 2024

(54) METHOD AND RHEOMETER FOR DETERMINING THE DENSITY OF AN AT LEAST FLOWABLE, IN PARTICULAR LIQUID, SPECIMEN

(71) Applicant: Anton Paar GmbH, Graz-Strassgang (AT)

(72) Inventors: Denis Schuetz, Graz (AT); Chistopher Giehl, Ludwigsbug (DE); Daniela Ehgartner, Deutschlandsberg (AT)

(73) Assignee: Anton Paar GmbH, Graz-Strassgang (AT)

( * ) Notice: Subject to any disclaimer, the term of this patent is extended or adjusted under 35 U.S.C. 154(b) by 0 days.

(21) Appl. No.: 17/366,700

(22) Filed: Jul. 2, 2021

(65) Prior Publication Data

US 2022/0011211 A1     Jan. 13, 2022

(30) Foreign Application Priority Data

Jul. 7, 2020    (AT) .............................. A 50582/2020

(51) Int. Cl.
    *G01N 11/14*        (2006.01)
    *G01N 11/16*        (2006.01)

(52) U.S. Cl.
     CPC ........... *G01N 11/14* (2013.01); *G01N 11/162* (2013.01)

(58) Field of Classification Search
     CPC ........ G01N 11/14; G01N 11/162; G01N 9/00; G01N 9/10–22
     USPC .................. 73/32 R, 451, 453, 54.02, 54.23, 73/54.28–54.34, 54.01–54.43
See application file for complete search history.

(56) References Cited

U.S. PATENT DOCUMENTS

| | | |
|---|---|---|
| 2,357,003 A | 8/1944 | Hurndall |
| 6,167,752 B1 | 1/2001 | Raffer |
| 6,240,770 B1 | 6/2001 | Raffer |
| 6,571,610 B1 | 6/2003 | Raffer |

(Continued)

FOREIGN PATENT DOCUMENTS

| | | |
|---|---|---|
| AT | 404192 B | 9/1998 |
| AT | 409422 B | 8/2002 |
| AT | 513661 B1 | 2/2015 |

(Continued)

*Primary Examiner* — Robert R Raevis
(74) *Attorney, Agent, or Firm* — Laurence A. Greenberg; Werner H. Stemer; Ralph E. Locher

(57) ABSTRACT

A method for determining the density of an at least flowable, in particular liquid, specimen with a rheometer, in particular a rotational rheometer, includes providing the rheometer with a first measurement component for receiving the at least flowable, in particular liquid, specimen, and a second measurement component with a known volume to be immersed into the specimen. The first and second measurement components are movable relative to one another. The perpendicular force between the two measurement components is measured after the immersion of the second measurement component into the specimen. The measured perpendicular force corresponds to the buoyancy force acting between the specimen and the second measurement component. The density of the specimen is calculated based on Archimedes' principle by reference to the known volume of the second measurement component and the measured perpendicular force. A rheometer for carrying out the method is also provided.

23 Claims, 5 Drawing Sheets

(56) References Cited

U.S. PATENT DOCUMENTS

2006/0081037 A1    4/2006  Platzek et al.

FOREIGN PATENT DOCUMENTS

| DE | 4412405 A1  | 10/1995 |
| DE | 19632589 A1 | 2/1998  |
| DE | 19911441 A1 | 9/2000  |
| DE | 19963686 A1 | 7/2001  |
| DE | 10310676 A1 | 9/2004  |
| DE | 10340555 B3 | 9/2004  |
| IE | 20020212 *  | 10/2002 |

* cited by examiner

METHOD AND RHEOMETER FOR DETERMINING THE DENSITY OF AN AT LEAST FLOWABLE, IN PARTICULAR LIQUID, SPECIMEN

CROSS-REFERENCE TO RELATED APPLICATION

This application claims the priority, under 35 U.S.C. § 119, of Austrian Patent Application AT A50582/2020, filed Jul. 7, 2020; the prior application is herewith incorporated by reference in its entirety.

BACKGROUND OF THE INVENTION

Field of the Invention

The invention relates to a method for determining the density of an at least flowable, in particular liquid, specimen with a rheometer and also to a rheometer for carrying out the method, in which the rheometer, in particular a rotational rheometer, includes a first measurement component for receiving the at least flowable or liquid specimen, and a second measurement component to be immersed into the specimen, the first measurement component and the second measurement component being movable relative to one another and the second measurement component having a known volume.

The prior art discloses a very wide variety of rheometers for determining the rheological properties of flowable, in particular liquid, specimens. However, the known rheometers have the disadvantage that the density of a test specimen cannot be determined in situ, i.e. directly in the rheometer during the course of determination of the rheological properties of the test specimen. For determination of the density of the flowable or liquid specimen, it is necessary to introduce it into external density-measurement equipment separate from the rheometer. The prior art discloses a very wide variety of density-measurement equipment which by way of example measures a difference value upon immersion of a measurement body into the liquid specimen. On the basis of this measured difference it is then possible to determine the density of the liquid specimen. The only possibility, if indeed there is any possibility at all, for removing the test specimens in order to undertake a density measurement thereon, is to stop the experiment in the rheometer.

The impossibility of determining the density of a flowable, in particular liquid, specimen directly in the context of, or in the course of, determination of its rheological properties is particularly disadvantageous when the rheological parameters of the test specimen are determined by way of example in high-temperature tests. Firstly, in the case of substances that are not reactive at high temperatures and have a constant chemical composition, there can be a decrease of density with increasing temperature in the molten state, in addition to the abrupt change of density upon melting of the substances. Secondly, many specimens exhibit high reactivity at high temperatures: not only reactivity with the constituents of the coexisting atmosphere (e.g. oxygen) but also reactivity with the container material surrounding the substance (e.g. ceramic, metals). When such reactions proceed, it is often difficult to assess, during rheological measurements, whether the changes in the measurement signals result from the rheological properties of the specimen itself, or from changes in temperature or from chemical alterations.

BRIEF SUMMARY OF THE INVENTION

It is accordingly an object of the invention to provide a method and a rheometer for determining the density of an at least flowable, in particular liquid, specimen, which overcome the hereinafore-mentioned disadvantages of the heretofore-known methods and rheometers of this general type and which permit determination of the density of a flowable, in particular liquid, specimen without the need for removal of the specimen from the rheometer and introduction of the same into external density-measurement equipment.

With the foregoing and other objects in view there is provided, in accordance with the invention, a method for determining the density of an at least flowable, in particular liquid, specimen with a rheometer, where the rheometer includes a first measurement component for receiving the at least flowable, in particular liquid, specimen and a second measurement component which is immersed into the specimen, where the first measurement component and the second measurement component can be moved in relation to one another and where the volume of the second measurement component is known.

The invention performs the following steps:
measuring the normal force between the two measurement components after the immersion of the second measurement component into the specimen, where the measured normal force corresponds to the buoyancy force that acts between the specimen and second measurement component, and
calculating the density of the specimen on the basis of the Archimedes' principle by reference to the known volume of the second measurement component and to the measured normal force.

When the second measurement component is immersed into the specimen located in the first measurement component, the second measurement component experiences various buoyancy forces which depend on the density of the flowable, in particular liquid, test specimen, the initial effect during immersion of the second measurement component into the specimen being the resistance that the specimen exerts in opposition to displacement during immersion. Once the second component has been immersed into the specimen, the only residual force acting on the second measurement component in the specimen is the buoyancy force. It is therefore technically possible to use the buoyancy of a measurement component of known volume in the liquid or flowable specimen to measure the density of the specimen on the basis of its buoyancy and, respectively, to determine the density of the specimen by reference to the measured normal force (Archimedes' principle applied to a body that is as stationary as possible). This advantageously allows continuous density measurement of the flowable, in particular liquid, specimen directly in the rheometer.

A method of the invention can particularly preferably be used by way of example for density measurement on polymers, on salt melts, on metal melts, on glass melts, or on rock melts, or on slags.

In order to permit study of the temperature-dependency of density, this being of particular interest for rheological experiments at high temperatures, it can be provided that, during the measurement of the normal force, the specimen is temperature-controlled, in particular heated and/or cooled, where the determination of the density of the specimen is repeated at different temperatures, where in particular it is provided that the specimen is heated up to a temperature of 1730° C.

It is thus advantageously possible to observe the melting of a specimen by reference to the measured normal force and thus to study, in the rheometer, the abrupt change of density on melting, and also the decrease of density with increasing temperature in the molten state in the case of substances that are not reactive at high temperatures and have a constant chemical composition, and also to obtain information concerning the behavior of specimens which at high temperatures exhibit high reactivity in particular with the constituents of the coexisting atmosphere in the rheometer (e.g. oxygen, inert gases or forming gases), or exhibit temperature-dependent reactions and/or phase transitions in the specimen and/or with the measurement-component material in contact with the substance.

A particularly precise determination of the density of the flowable, in particular liquid, test specimen can be achieved when, before the determination of the density, the thermal expansion of the second measurement component is determined at various reference temperatures and is stored, in particular in the form of a volume-correction curve or volume-correction table, and when, during a following determination of the density of the specimen, the influence of temperature on the volume of the second measurement component at the respective measurement temperature is corrected and/or taken into account by reference to the stored values.

This procedure advantageously permits correction of the effect of thermal expansion of the measurement components on the density measurement when measurement components with relevant thermal expansion are used in rheological experiments which are carried out at high temperatures in the rheometer.

For a particularly precise determination of the density of the flowable, in particular liquid, test specimen, it can moreover be provided that, before the measurement of the density of the specimen, test measurements are carried out at various reference temperatures with reference liquids whose density at prescribed reference temperatures is known, where the influence of temperature on the volume of the second measurement component and on the normal-force measurement is determined in combination and is stored, in particular in the form of a normal force-correction curve or normal-force-correction table, and that, during a following determination of the density of the specimen, the influence of temperature on the volume of the second measurement component and on the measured normal force in combination at the respective measurement temperature is corrected by reference to the stored values.

It is thus particularly advantageously possible to take into account, simultaneously in combination during the calculation of the density of the flowable, in particular liquid, test specimen, the volume change and, respectively, thermal expansion of the second measurement component and any possible equipment-specific additional effects, for example the stiffness of the rheometer at high temperatures and/or expansion of the measurement axis.

In order to permit particularly versatile determination of the density of a flowable, in particular liquid, test specimen it can be provided that
the first measurement component or the second measurement component, which usually rotates during a rheometric measurement, is kept stationary during the measurement of the normal force or
the first measurement component or the second measurement component oscillates rotationally and/or rotates during the measurement of the normal force.

It is thus particularly advantageously possible, for example during rheological oscillation tests in the rheometer, to determine the density directly and, respectively, to, for example, briefly interrupt the rheological rotation test in the rheometer, then to measure the normal force, and then to continue the rheological rotation test, without any need to remove the specimen from the first measurement component.

In order that the precise density of the flowable, in particular liquid, test specimen in the molten state is immediately available during rheological tests, in particular at the respective temperature at which the test is carried out, without any error in said density due to, for example, rapid cooling and removal of the specimen from the rheometer, it can be provided that, in addition to the determination of the density of the liquid specimen, in particular simultaneously with the determination of the density of the specimen, rheological parameters of the liquid specimen are determined, in particular the viscosity.

In order to ensure a particularly precise determination of the density of the flowable, in particular liquid, test specimen, it can be provided that the temperature of the liquid specimen and/or of the first measurement component and/or of the second measurement component is measured, and that the density is not determined until the temperature of the liquid specimen and/or of the first measurement component and/or of the second measurement component reaches a prescribed temperature-threshold value.

It is thus possible to achieve particularly efficient prevention of undesired influence of the thermal expansion of the second measurement component, or of equipment-specific additional effects, on the measurement of density.

In order to achieve immediate availability of the precise density of the flowable, in particular liquid, test specimen in the molten state during rheological tests, in particular at the respective temperature at which the test is carried out, it can be provided that
before the determination of the density of the specimen
the geometric density at least of one reference liquid is calculated from the mass of the reference liquid introduced into the first measurement component and from the position, determined during the approach of the second measurement component, of the surface of the reference liquid, and from the known geometry of the first measurement component, in particular at prescribed reference temperatures,
the density of the reference liquid is determined, in particular at the prescribed reference temperatures, by a method according to the invention, and a correction factor is determined via a comparison of the determined value of the density of the reference liquid with the determined value of the geometric density of the reference liquid, and in particular is stored in the evaluation unit, and
during a following determination of the density of the specimen, the effect of the immersion depth of the second measurement component into the specimen, in particular at the respective measurement temperature, is corrected by reference to the determined correction factor.

The geometric density of at least one reference liquid is therefore determined during the positioning of the second measurement component, in particular of a measurement body. For this, the increase in normal force during contact with the reference liquid is used to measure the height and, respectively, position of the specimen surface in the first measurement component, and the density is determined geometrically from this together with the previously measured or known mass of specimen that was introduced into the first measurement component and from the known geometry and fill level of the volume of specimen in the first measurement component. This geometric-density base value can be compared with the density value determined in the invention after immersion, and the difference between these values can be used as correction value in the remainder of the method in order to correct for the influences resulting from the depth of immersion of the second measurement component into the specimen and from any possible differences in contributions from the measurement shaft.

In order to ensure that the density determined in the invention is not influenced by variations in immersion depths during measurement of the normal force, it can be provided that the vertical distance between the two measurement components is in essence kept constant during the measurement of the normal force.

The meaning of "vertical distance between the two measurement components," or "height difference," hereinafter is the distance between the first measurement component, i.e. for example the base of a measurement cup, and the second measurement component, for example the upper end of a measurement cylinder with a flat or pointed lower end.

With the objects of the invention in view, there is also provided a rheometer which permits, during the course of rheological tests, direct measurement of density in the rheometer, without any requirement that, for the determination of density, the specimen is removed from the rheometer and introduced into separate density-measurement equipment.

The invention achieves this object with a rheometer for determining the density of an at least flowable, in particular liquid, specimen. It is provided that the rheometer in the invention in this case, in particular rotational rheometer, comprises the following components:
- a first measurement component for receiving the liquid specimen and a second measurement component with known volume, where the second measurement component is disposed in the rheometer in a manner such that it can be immersed into the liquid specimen, and where the first measurement component and the second measurement component are disposed in the rheometer in a manner such that said measurement components can be moved relative to one another,
- a normal force-measurement unit which is disposed and configured in the rheometer in a manner such that the normal force between the two measurement components can be measured, in particular force before, during and after the immersion of the second measurement component into the specimen, where the measured normal force corresponds to the buoyancy force that acts between the liquid specimen and the second measurement component, and
- a control and processing unit which is configured to calculate the density of the specimen on the basis of the Archimedes' principle, in particular by a method of the invention.

The invention advantageously permits direct determination of the density of a flowable, in particular liquid, specimen in the rheometer by using a normal-force measurement in the rheometer, so that it is not possible to remove the specimen from the rheometer for the determination of density and, respectively, the density can be determined independently of the rheological tests.

Particularly advantageous testing of flowable, in particular liquid, specimens can be ensured:
- if the first measurement component is configured as measurement cup with in essence cylindrical cross section,
- if the second measurement component is configured as measurement body with in essence cylindrical cross section, in particular as rheological measurement spindle, where the external diameter of the second measurement component is smaller than the internal diameter of the first measurement component, and
- if the first measurement component and the second measurement component are disposed coaxially in the rheometer, so that a gap with defined width can be configured between the concentric walls of the first measurement component and of the second measurement component.

Coaxial cylinder measurement systems of this type have the advantage that the specimen cannot move laterally outward and that, for example, any possible sedimentation of particles in the specimen has less effect on the measurement result.

Particularly precise temperature-control of the specimen in the rheometer can be achieved if the rheometer includes a heating and/or cooling device for controlling the temperature of the specimen. It is thus possible, for specimens which have high reactivity at high temperatures, to test whether the changes in the measurement signals are caused by processes resulting from rheology, changes in temperature or chemical changes.

This, with the direct in-situ measurement of density, not only permits the capture of a further measurement variable at high temperatures, but also, via continuous measurement, allows simultaneous observation and balancing with temperature and measurement variables relating to rheology. It is in turn thus possible to draw conclusions concerning the relationships between chemical change via reaction with the materials of the measurement components or reactions within the specimen and the density changes associated therewith.

This embodiment of a rheometer of the invention can be used not only for easier correction of undesired effects but also to bring about targeted density changes, which may also be a component of high-temperature processes or of high temperature experiments. Examples of technologically relevant density changes are oxidation/reduction processes in redox-sensitive melts, e.g. the separation of elemental metals (suspensions) or metal melts (emulsions) from slags in extractive metallurgy, corrosion of refractive materials in same, thermal degradation of glasses or of ionic liquids and change in alloys due to evaporation or dissolution in the materials of the measurement components in the case of metals.

A rheometer of the invention can be constructed in particularly compact form if the heating and/or cooling device:
- is disposed in the first measurement component, in particular in the form of at least one Peltier element, and/or
- is configured as temperature-control hood, in particular that can be disposed above the two measurement components, and/or
- is configured as convection heating and/or convection cooling chambers which control the temperature of the measurement components and of the specimen via gases and fluids, and/or is realized as high-temperature oven in which the first measurement component and the second measurement component are disposed.

In an advantageous structural variant of a rheometer of the invention it can be provided that:

the rheometer includes at least one measurement motor with a measurement shaft, where the first measurement component or the second measurement component has connection to the measurement shaft so that the respective measurement component can be set in rotating and/or oscillating motion in relation to the other measurement component, and the control and processing unit is configured to prescribe the rotation rate of the measurement motor and to measure the torque arising at the measurement shaft and/or to prescribe the torque of the measurement motor and to measure the rotation rate of the measurement motor.

In another advantageous structural variant of a rheometer of the invention it can be provided that:

the rheometer includes a first measurement motor with a first measurement shaft, where the first measurement component has connection to the first measurement shaft, so that the first measurement component can be set in rotating and/or oscillating motion, includes a second measurement motor with a second measurement shaft, where the second measurement component has connection to the second measurement shaft, so that the second measurement component, independently of the first measurement component, can be set in rotating and/or oscillating motion, and the control and processing unit is configured:

respectively to prescribe the rotation rate of the first measurement motor and/or of the second measurement motor and to measure the torque arising at the first measurement shaft and/or at the second measurement shaft, and/or respectively to prescribe the torque of the first measurement motor and/or of the second measurement motor and to measure the rotation rate of the first measurement motor and/or of the second measurement motor.

An advantageous structural variant of a rheometer of the invention, where experiments can be carried out at a very wide variety of temperatures with particularly low operator cost, can be provided if the control and processing unit is configured to control the heating and/or cooling device.

Particularly precise density determination via a particularly simple method for taking simultaneous account of the volume change or thermal expansion of the second measurement component and/or of any additional equipment-specific effects during temperature changes can be ensured if the control and processing unit includes a memory unit and is configured to store, in the memory unit, a predetermined volume-correction curve and/or volume-correction table and/or normal force-correction curve and/or normal-force-correction table.

An advantageous embodiment of a rheometer of the invention, with which rheological experiments can be evaluated particularly precisely and with particularly low operator cost, can be provided if the control and processing unit is configured to evaluate, in particular simultaneously with the determination of the density of the liquid specimen, the measured values determined in relation to the respective measurement shaft and/or to the respective measurement motor, and to determine at least one rheological parameter, in particular the viscosity, of the liquid specimen.

In an advantageous structural variant of a rheometer of the invention it can be provided that the normal-force-measurement unit has connection to the first measurement component and that a further normal-force-measurement unit has connection to the second measurement component, where the further normal-force-measurement unit is configured to measure, preferably simultaneously with the normal-force-measurement unit, the normal force between the two measurement components, in particular before, during and after the immersion of the second measurement component into the specimen.

Other features which are considered as characteristic for the invention are set forth in the appended claims.

Although the invention is illustrated and described herein as embodied in a method and a rheometer for determining the density of an at least flowable, in particular liquid, specimen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
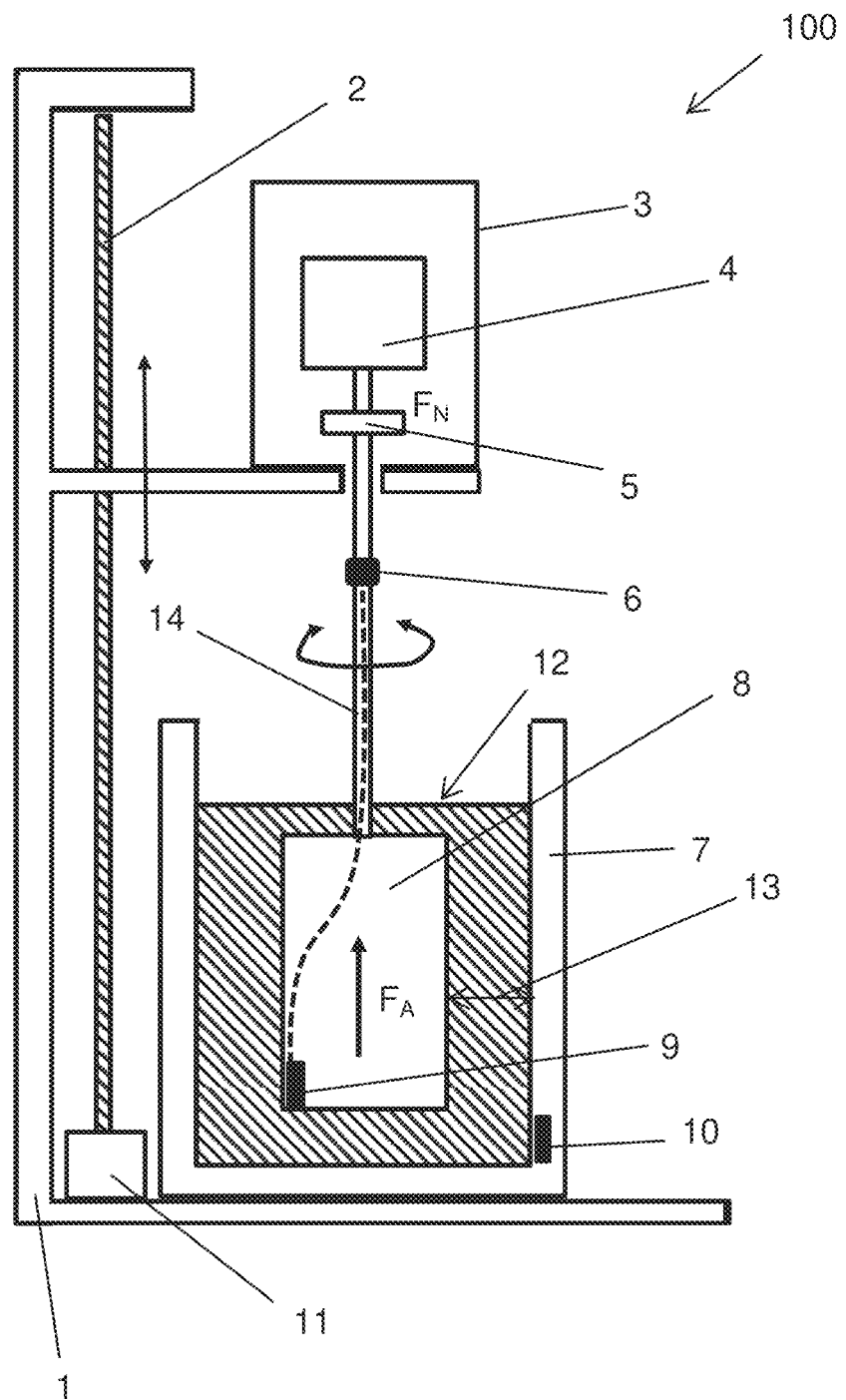
FIG. 1 is a diagrammatic, longitudinal-sectional view of a first working example of a rheometer of the invention.

Referring now in detail to the figures of the drawing as a whole, there are seen various rheometers 100 which can be used or employed in the present invention. A rheometer 100 of the invention can by way of example be a rotational or rotation rheometer. These rheometers 100 have a structure known from the prior art and, respectively, have known components. The rheometer 100 includes by way of example a stand 1, a spindle 2, which in combination with a spindle motor 11 can provide defined height adjustment (there also being other automated solutions) that can modify the distance between two measurement components 7, 8, a rheometer housing 3 which mostly accommodates a control and processing unit, a measurement motor 4, and a measurement shaft 14. Such a rheometer 100 of the invention moreover has at least one normal-force-measurement unit 5 for determining the normal force $F_N$ between the two measurement components 7, 8.

Rotation rheometers generally have measurement components disposed replaceably on a measurement shaft, i.e. a first measurement component 7, for example a measurement cup, for receiving the flowable, in particular liquid, test specimen 12, and a second measurement component 8, e.g. a measurement cylinder or stirrer, which is immersed into the specimen 12 during a measurement.

In the case of a rotation rheometer, the test specimen 12 is introduced into a measurement chamber between the first measurement component 7 and the second measurement component 8. During the measurement, the specimen 12 is sheared between a rotating and/or oscillating component and a stationary component of the arrangement. The first measurement component 7 and the second measurement component 8 are set in rotating motion relative to one another around a shared axis of rotation, and the rotary motion of the measurement components 7, 8 in relation to one another subjects the specimen to a shear load. Possible forms of motion here are not only rotating but also rotating-oscillating.

The shear rate is calculated from the geometry of the measurement arrangement and the velocity of rotation and/or rotation rate of the respective moving measurement component. The resultant torque exerted by the specimen in opposition to the motion is measured, and from this it is then possible to determine the shear stress and thus the viscosity and other rheological parameters.

The measurement components 7, 8 in the rheometer 100 can in principle have different geometries. The systems here can by way of example be plate-on-plate measurement systems, concentric cylinder measurement systems, cone-and-plate measurement systems, or else specific arrangements for various application sectors, e.g. for measuring the immobilization behavior of dispersions or construction materials, or for electrorheological measurements. It is possible here that the first measurement component 7 is stationary during a rheological measurement and that the second measurement component 8 rotates (Searle system) or vice-versa (Couette system).

When the second measurement component 8, for example a simple measurement cylinder, is immersed into the specimen which is located in the first measurement component 7, for example in a measurement cup, the second measurement component 8 experiences various buoyancy forces $F_A$ which depend on the density of the specimen.

The normal force, or the initial normal-force increase, that acts initially on the second measurement component 8 during immersion initially corresponds to the resistance that the specimen 12 exerts in opposition to displacement during immersion. The initial normal-force increase when the second measurement component 8 encounters the sample surface can therefore be utilized by way of example to determine the height of the sample surface.

The rheometer 100 itself has high stiffness on the stand 1, because the intention is that the height difference remains constant and therefore that the immersed second measurement component 8 does not undergo any change of location and by way of example does not bend. The weight of the second measurement component 8 is borne by the measurement motor 4 on the stand 1. The resultant normal force $F_N$ therefore corresponds to the buoyancy or the buoyancy force $F_A$ acting between the specimen 12 and the measurement components 7, 8. The buoyancy $F_A$ prevailing on the second measurement component 8 in accordance with the Archimedes' principle due to displacement of the specimen 12, with no additional contribution from the resistance to displacement, therefore acts after the immersion of the second measurement component 8 into the specimen 12, i.e. when the second measurement component 8 is stationary in relation to change of height, with a fixed or constant measurement gap 13 and constant height of the second measurement component 8 in the first measurement component 7, e.g. a measurement cup.

The expression "measurement gap 13" in a concentric measurement system means the distance between the surfaces of the measurement components 7, 8, said surfaces being rotated relative to one another and being in essence cylindrical. The height difference, i.e. the vertical distance or the smallest distance between the first measurement component 7, i.e. the base of the measurement cup, and the second measurement component 8, for example the upper end of a measurement cylinder with a flat or pointed lower end, is kept constant in the rheometer 100, and demands high stiffness of the rheometer 100, due to the stand 1 and to the bearing system used for the measurement shaft(s).

This circumstance can be utilized in order to determine the density $\rho$ of the specimen 12 in accordance with the Archimedes' principle with the aid of a normal-force measurement in the rheometer 100. The density $\rho$ of the specimen 12 is calculated here from the following relationships or equations:

$$m=F_N/g \tag{1}$$

$$\rho=m/V \tag{2}$$

$$\rho=F_N/^*g) \tag{3}$$

where m is the mass of the specimen 12, $F_N$ is the measured normal force, g is the acceleration due to gravity, p is the density of the specimen 12 and V is the volume of the second measurement component 8.

This means that, with the aid of the invention, it is possible in the rheometer 100 to determine, quasi simultaneously, in situ, the rheological parameters of a specimen 12, for example the viscosity and the density $\rho$ of the specimen 12.

Measurement of the normal force $F_N$ can be achieved in a very wide variety of ways in a rheometer 100 of the invention. The precise nature of the determination of the normal force $F_N$ between the first measurement component 7 and the second measurement component 8 is of no great importance here.

By way of example, there can, as described in U.S. Patent Application Publication No. 2006/081037 A1, be a normal-force-measurement unit 5 provided for recording the normal force and/or the torque arising in the measurement shaft 14 during a measurement. The normal-force-measurement unit 5 includes a first retention component connected to the measurement shaft 14 and a second retention component mounted stationary on a frame. The second retention component has connection to the first retention component by way of resilient connecting components, and attached on at least one of the connecting components there is a strain gauge through the use of which it is possible to record the deformation of the connecting components.

The normal-force measurement unit 5 can also, as in German Patent Application DE 103 10 676 A1, have an encoder disk which extends in essence normally to the longitudinal axis of the measurement shaft 14, and record axial motion of the encoder disk in the direction of the longitudinal axis of the measurement shaft 14, and thus determine, from the recorded motion of the encoder disk, the normal forces $F_N$ experienced by the measurement shaft 14.

The normal force-measurement unit 5 can also, as in German Patent Application DE 196 32 589 A1, have a round pressure sensor which is disposed on the first measurement component 7 or on the lower measurement plate, centrally and level, at right angles to the axis of the measurement component, and whose, for example electrical, measurement signal correlates unambiguously with the normal force $F_N$ produced by shear in the measurement gap 13 in the viscoelastic specimen 12.

There can also be normal-force sensors disposed on the first measurement component 7 and/or second measurement component 8, or there can be a distance sensor provided which measures the change of the axial distance relating to a spring 7 connected to the second measurement component 8, in order to calculate the normal force $F_N$ from the measurement values provided by these sensors.

The normal-force-measurement unit 5 can also be accommodated in its own housing separate from the two measurement components 7, 8.

During the conduct of rheological oscillation tests, the density ρ of the specimen 12 can be determined directly in the invention, while in the case of rotational tests a short interruption is sufficient for measurement of the normal force $F_N$. The density ρ of the specimen 12 can therefore be measured directly in the first measurement component 7 with a short interruption of a rheological measurement, or directly during the rheological measurement. It is of no great importance here which of the two measurement components 7, 8 is actually set in motion during measurement of the rheological properties and which of the two measurement components 7, 8 remains stationary; the only decisive condition is that the measurement components 7, 8 are moved relative to one another.

Various configurations can therefore also be applied for the measurement motors in a rheometer 100 of the invention and, respectively, in a method of the invention for determining the density ρ of an at least flowable, in particular liquid, specimen 12 with a rheometer 100. It is firstly possible by way of example to prescribe the rotation rate of the motor and to measure the resultant torque, or conversely to prescribe the torque of the motor and to measure the resultant rotation rate. The rotation rates here can by way of example be measured with an angle encoder and, respectively, the torque values can be determined from the electrical current consumption. Structures using two separate motors can in the simplest case include a rotational motor and a torque measurement system.

It is also possible to determine the density ρ of the specimen 12, and its rheological properties, as temperature-dependent variables, if the specimen 12 is temperature-controlled.

This temperature control can be achieved in a very wide variety of ways. By way of example, the first measurement component 7 can be configured as heated measurement cup, as described in U.S. Pat. No. 6,240,770 B1 and, respectively, German Patent Application DE 19911441 A1. A rheometer 100 of the invention can also include a temperature-control hood, as described by way of example in U.S. Pat. No. 6,571,610 B1 and, respectively, Austrian Patent AT 409 422 B, or else a high-temperature oven for rheological tests. Convection-heating chambers and/or convection-cooling chambers which use gases or fluids to achieve temperature-control of the measurement components 7, 8 and of the specimen 12 are also known. A system of this type is described by way of example in Austrian Patent AT 513661 B1.

The second measurement component 8 for the density measurement can be of any desired configuration, and the weight of the second measurement component 8 is also of no importance, because of course the second measurement component 8 is vertically fixed and, respectively, retained.

The known volume V of the second measurement component 8 is decisive for the invention. For the inventive determination of the density ρ of the specimen 12 here, the volume V of the second measurement component 8 is known as a function of temperature and, respectively, is determined in advance and by way of example stored in the control and processing unit, so that the known volume V of the second measurement component 8 can therefore be retrieved at any time in order to determine the density ρ of a specimen 12, for example during a rheological test of the specimen 12.

The following rule is applicable, and is based on the density ρ to be determined for a specimen 12: the lighter the specimen 12 (lower density p), the greater the difficulty of measurement, because a greater volume is required to achieve a distinguishable buoyancy force $F_A$. As is apparent from the abovementioned formulae (1)-(3), both a higher specimen density ρ and a larger displaced volume V (volume V of the second measurement component 8) lead to a greater normal-force signal $F_N$. The measurable specimen densities and, respectively, the accuracy of measurement can therefore be controlled via the selection of the second measurement component 8.

It is therefore possible to provide measurement bodies or second measurement components 8 with precisely measured volume V for different density ranges. The size of the first measurement component 7 and of the second measurement component 8 can be selected in a manner that achieves a good measurement signal of the normal force $F_N$ for the respective specimen 12, i.e. that achieves a sufficiently large change of the buoyancy force $F_A$.

The following rule optionally applies: the lower the density ρ of the test specimen 12 or of the test liquid, the larger the second measurement component 8 used should be.

The result of equation (3) for the buoyancy or the buoyancy force $F_A$ or the normal-force signal to be measured is: $F_N=\rho*(V*g)$. The volume V of the second measurement component 8 or of the measurement body should therefore be greater for lower densities ρ, in order to provide comparable measured values and, respectively, in order to provide comparable normal-force differences for relative density changes.

The size that can actually be used for the second measurement components 8 or the measurement bodies therefore depends on the resolution capability of the normal-force measurement and on the test specimens. The smallest measurable normal force can by way of example be $5*10^{-5}$ N (50 μN). At the same time, the measurement gap 13 between the measurement components 7, 8 should optionally be sufficiently large to avoid peripheral effects. Here again, the respective selection is influenced by the viscosity and the surface tension of the specimen 12.

It is moreover also possible, for example at the start of the measurement, to carry out a calibration with relatively high precision. During this, for example after the melting of the specimen 12, the procedure of immersion of the second measurement component 8, and with this the position of the specimen surface, is observed by using the increase in the normal-force signal. The precise volume of the molten specimen 12 in the first measurement component 7 is thus determined from the geometric data of the first measurement component 7 and the position of the specimen surface. Because the input weight is known, the geometric density $\rho_{Geo}$ of the specimen 12 can be determined with the aid of the abovementioned equation (2).

Through comparison with the density $\rho$ determined in the invention after the immersion of the second measurement component 8, it is possible to obtain precise knowledge of the exact immersion depth and thus of the volume displaced by the second measurement component 8 and the measurement shaft; the buoyancy $F_A$ due to the displacement of the specimen 12 by the measurement shaft and the second measurement component 8 can be taken into account.

It is thus possible, within a measurement procedure, to apply two methods of (melt-)density determination—namely firstly the above-described density measurement of the invention by using the measured normal force $F_N$ and of the known volume V of the second measurement component 8 by reference to the equations (1)-(3); secondly, the volume of the specimen 12 can be determined by reference to the first normal-force increase during immersion of the second measurement component 8 into the specimen 12, where said increase corresponds to the position of the sample surface during approach of the measurement components 7, 8 toward one another, and the density $\rho$ of the specimen 12 can be calculated by way of the mass m of the specimen 12 determined for example via weighing before introduction of the specimen 12 into the second measurement component 8 or via in-situ determination of the mass by using normal-force measurement in the first measurement component 7 in accordance with equation (1). The mass of the specimen 12 can therefore optionally be determined on introduction into the first measurement component 7, for example via determination of the change of normal force.

By reference to this comparison of these two density-determination variants, it is possible to increase accuracy or to validate the density value determined by Archimedean measurement. The correction value determined for the immersion depth or proportion of the measurement shaft is optionally used for the following measurements of the density p, for example during periods in which temperature profiles are applied.

FIG. 1 shows a first working example of a rheometer 100 of the invention, this being a rotation or rotational rheometer. The rheometer 100 has a stand 1, a height-adjustment spindle 2, which is driven by a spindle motor 11, a rheometer housing 3, which accommodates a control and processing unit, and also a measurement motor 4 which is disposed on the stand 1 and which likewise is accommodated in the rheometer housing 3.

Figure 2:
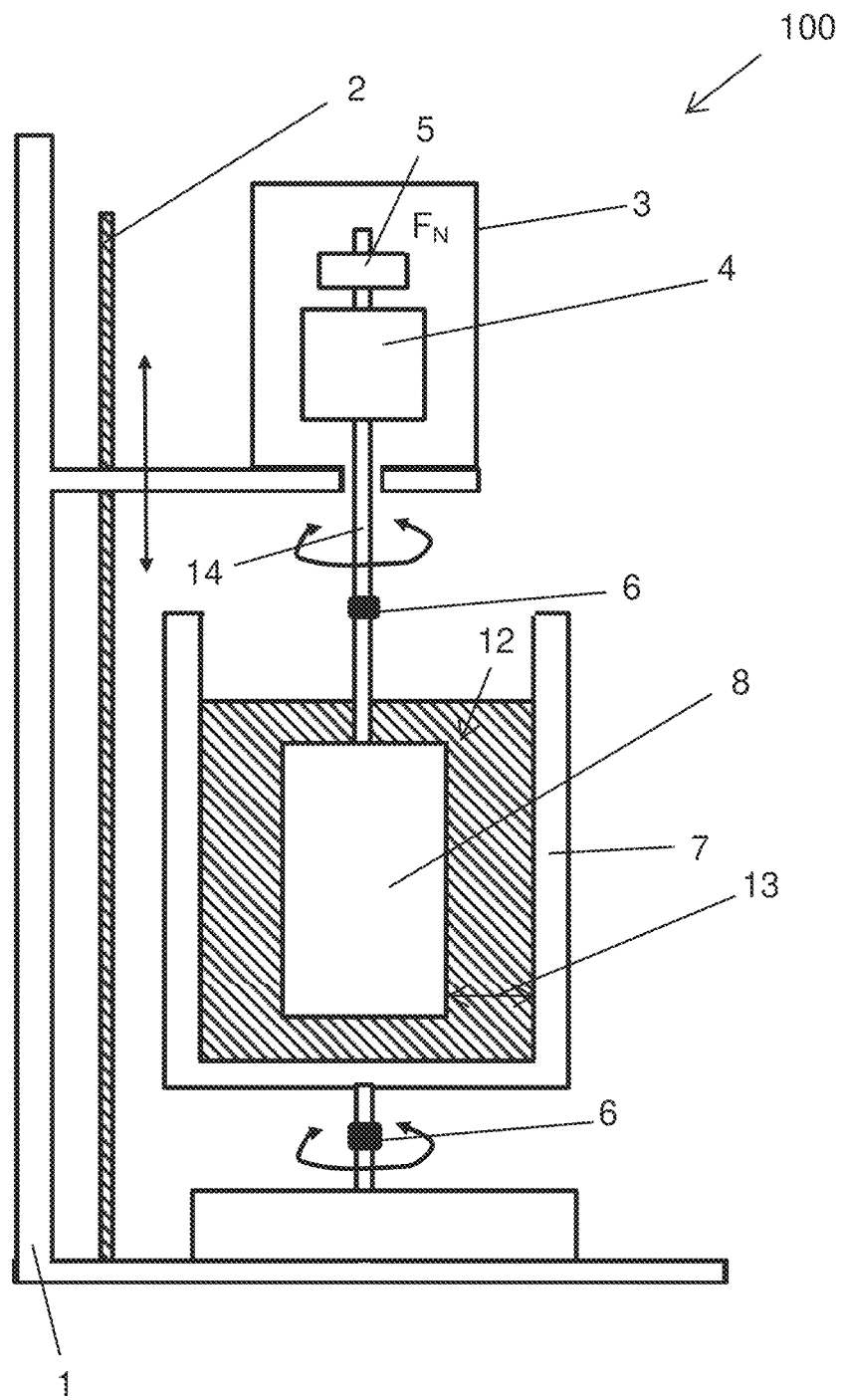
FIG. 2 is a longitudinal-sectional view of a second working example of a rheometer of the invention.
Figure 3:
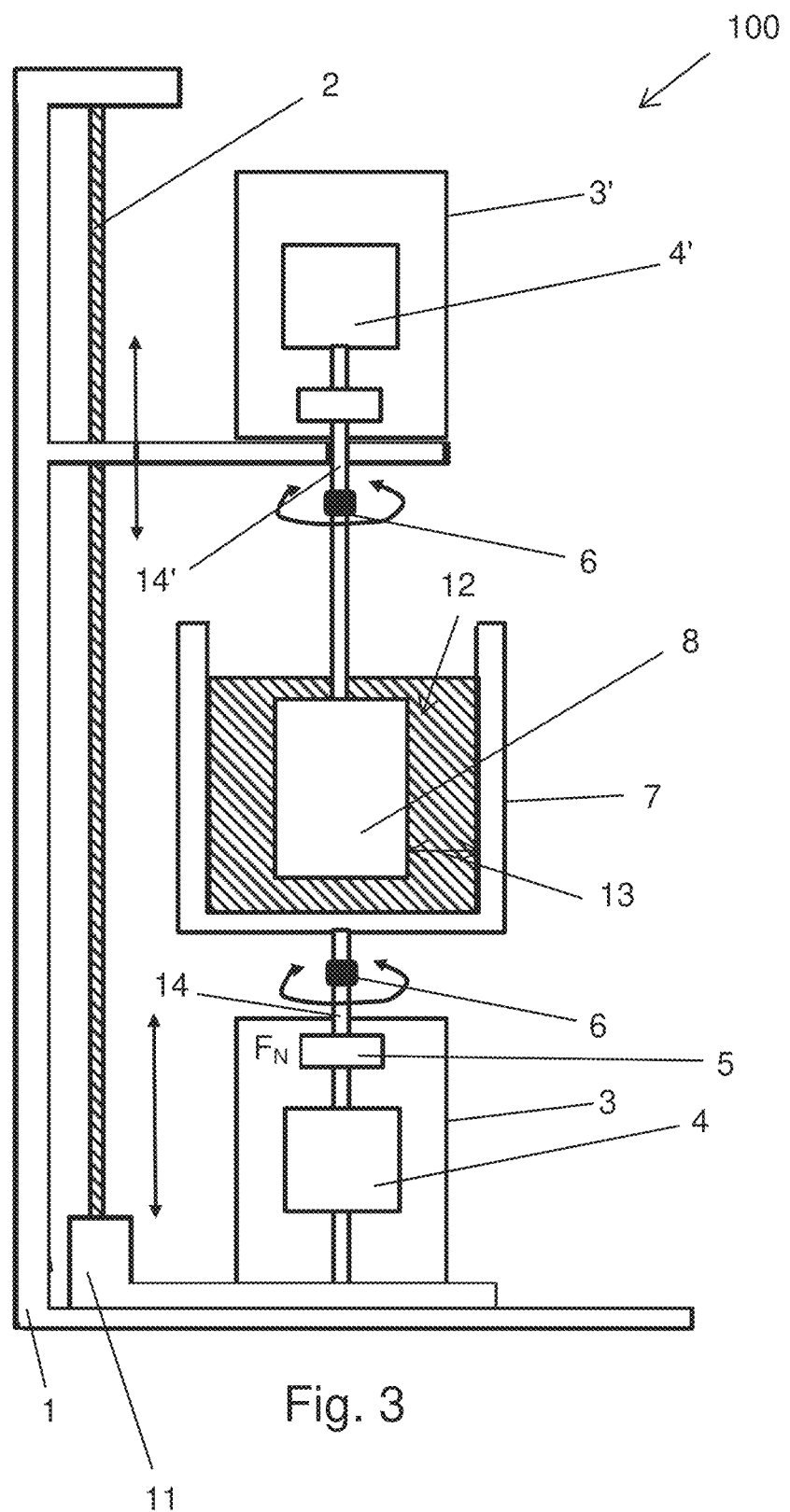
FIG. 3 is a longitudinal-sectional view of a third working example of a rheometer of the invention.

The control and processing unit in FIG. 1 has connection to all measurement units and, respectively, to all sensors, and evaluates the measurement data obtained, but is not separately included in the drawing in FIGS. 1 to 3, because said unit can be integrated at a very wide variety of positions in the rheometer 100, or is a unit which, being separate from the rheometer 100, has connection to the components of the rheometer by way of a cable connection or a wire-free connection, and which controls said components or receives data. The control and processing unit can by way of example be accommodated in the rheometer housing 3. The control and processing unit not only controls the measurement motor 4 but also determines or receives the measured values determined in relation to the measurement shaft 14 and evaluates these in order to derive or determine rheological parameters.

The rheometer 100 moreover has a normal-force-measurement unit 5 disposed in the rheometer housing 3 in order to determine the normal force $F_N$ between the two measurement components 7, 8. The control and processing unit has connection to the normal-force-measurement unit 5 and can implement a method of the invention for determining the density of a specimen 12. The normal-force-measurement unit 5 has a memory unit in which the known volume of the respective second measurement component 8, and also optionally calibration data and volume-correction curves and/or volume-correction tables and/or normal-force-correction curves and/or normal-force-correction tables can be stored; the determined density $\rho$ of the specimen 12 can be corrected by reference to these. Geometric data for the first measurement component 7 can moreover be stored in order to determine the geometric density $\rho_{Geo}$.

The second measurement component 8 can be changed at a chuck 6, known as a Toolmaster, and data characterizing the measurement body of the second measurement component 8 can be transmitted here by a contactless method. This particularly advantageously allows adaptation of the second measurement component 8 in accordance with the density $\rho$ of the specimen 12, or incorporation of two measurement components 8 formed of different materials adapted in accordance with the temperatures reached during the tests.

In the first working example, the measurement components 7, 8 are measurement cylinders disposed concentrically in relation to one another. Within the hollow cylindrical exterior first measurement component 7, a measurement cup, the second measurement component 8 is located, this being a second, coaxial, closed-cylindrical measurement body with the same axis of rotation. The specimen 12 to be tested is located in a measurement gap 13 between the two measurement components 7, 8, which are disposed at a defined distance from one another and thus determine the gap width and, respectively, gap height.

In order to avoid wallslip effects (wall slippage) during the measurement, the first measurement component 7 and the second measurement component 8 can optionally have additional structures on their curved cylinder surface in all working examples of a rheometer 100 of the invention.

In the first working example, the second measurement component 7 has connection to the measurement shaft 14, and the measurement motor 4 drives the measurement shaft 14 in a manner that sets the second measurement component 8 in rotating and/or oscillating motion relative to the first measurement component 7, while the first measurement component 7 remains stationary. In this case, the control and processing unit by way of example prescribes the rotation rate of the measurement motor 4 and measures the torque arising at the measurement shaft 14, and/or prescribes the torque of the measurement motor 4 and measures the rotation rate of the measurement motor 4. The control and processing unit then evaluates the measured values determined in relation to the measurement shaft 14 and/or the measurement motor 4, for example simultaneously with determination of the density $\rho$ of the liquid specimen 12, and on this basis determines rheological parameters of the specimen 12, for example viscosity, in accordance with procedures known from the prior art.

Coaxial cylinder measurement systems of this type have the advantage that the specimen cannot move laterally outward and that, for example, any possible sedimentation of particles in the specimen has less effect on the measurement result.

For the cylinder measurement systems, it is advantageous to use materials whose coefficient of thermal expansion in the temperature range tested is as small as possible or is very precisely known, for example certain glass-ceramics/metal alloys or platinum (alloys).

For measurements not involving study of any reactions, it is moreover advantageous to use, for the cylinder measurement systems or generally for the first measurement component 7 and the second measurement component 8, materials that are unreactive with, or have very little reactivity with, the sample material, examples being many noble-metal alloys.

In the first working example, the temperature of the specimen 12 is controlled by way of the first measurement component 7 and the second measurement component 8. In this cylinder measurement system, the temperature of the measurement cup and of the measurement body is controlled by using Peltier elements. Homogenization of temperature can be achieved here because a double measurement cup is used. It is thus possible to reduce the temperature gradient arising in the specimen 12 in the measurement gap 13 or shear gap between the internal wall of the measurement cup and the external wall of the measurement cylinder. In this case, the measurement cup is formed of a material with good thermal conductivity. An isolating gap here separates the interior measurement cup from an exterior thermostating cup which surrounds the measurement cup.

In the first working example, the normal-force measurement takes place in an air bearing, as described in AT 404192 B, corresponding to U.S. Pat. No. 6,167,752: the rheometer 100 has a measurement motor 4 which drives the measurement shaft 14, which bears a disk mounted in an air bearing of a stator. The normal-force-measurement unit 5 of the rheometer 100 moreover includes at least one displacement sensor, and determines the axial movements of the measurement shaft 14 deriving from viscoelastic properties of the test specimen 12. For normal-force measurement, the displacement sensor is disposed in the region of the air bearing on the stator, and records the movements of the disk that take place in axial direction of the measurement shaft 14 with respect to the stator.

As can be seen in FIG. 1, the rheometer 100 includes a temperature-measurement unit 10 disposed in the first measurement component 7, i.e. in the measurement cup, and a second temperature-measurement unit 9 disposed in the second measurement component 8, i.e. in the measurement cylinder. With the aid of the temperature-measurement units 9, 10 it is possible to determine whether the temperature in the specimen 12 has reached a prescribed temperature when the measurement gap 13 has ceased to change as a result of thermal fluctuations. In order to determine whether the measurement gap 13 is still undergoing change, there can be a contactless distance sensor, which determines the differences, disposed in the lower part of the first measurement component 7, i.e. of the measurement cup.

FIG. 2 shows a second working example of a rheometer 100 of the invention, the structure of which is similar to that of the first working example. In contrast to the first working example, however, the first measurement component 7 or the measurement cup in the second working example is not kept stationary but instead is set in rotating motion. The second measurement component 8 has connection to the measurement shaft 14, and the control and processing unit prescribes the rotation rate of the measurement motor 4, and measures the torque arising at the measurement shaft 14.

At two chucks 6 it is possible to change the two measurement components 7, 8, and data characterizing the measurement body can be transmitted here by a contactless method. This is particularly advantageous not only for allowing adaptation of the second measurement component 8 in accordance with the density ρ of the specimen 12, or incorporation of the second measurement component 8 formed of various materials adapted in accordance with the temperatures reached during the tests, but also for permitting variation of the volume of the specimen 12 accommodated in the first measurement component 7 in accordance with the strength of the buoyancy forces $F_A$ in the specimen 12 or with the density ρ of the specimen.

FIG. 3 shows a third working example of a rheometer 100 of the invention, the structure of which is similar to that of the first and second working examples. However, the rheometer 100 in the third working example includes two measurement motors 4, 4'.

The first measurement motor 4 is disposed in a first housing 3 and includes a first measurement shaft 14 to which the first measurement component 7 has connection, so that the first measurement shaft 14 sets the first measurement component 7 in rotating and/or oscillating motion. The second measurement motor 4' is disposed in a second housing 3' and includes a second measurement shaft 14' to which the second measurement component 8 has connection, so that the second measurement shaft 14' sets the second measurement component 8, independently of the first measurement component 7, in rotating and/or oscillating motion.

The control and processing unit respectively prescribes the rotation rate of the first measurement motor 4 and of the second measurement motor 4', and measures the torque arising at the first measurement shaft 14 and at the second measurement shaft 14', or respectively prescribes the torque of the first measurement motor 4 and of the second measurement motor 4', and measures the torque of the first measurement motor 4 and of the second measurement motor 4'.

The normal-force-measurement unit 5 in the third working example is accommodated in the first housing 3. At two chucks 6 it is possible to change the two measurement components 7, 8 as in the second working example, and data characterizing the measurement body or the second measurement component 8 can be transmitted here by a contactless method.

In the case of the rheometer 100 shown in the third working example, however, it is advantageously possible to arrange a normal-force-measurement unit 5 either in the first housing 3 or in the second housing 3' or else optionally in both housings 3, 3', so that the normal force $F_N$ can be measured either above or else below or optionally from both sides.

Examples of Density Measurements

The text below, and FIGS. 4 to 7, provide a summary of the results of a series of test measurements for the determination of density by a method of the invention that was carried out for various flowable or liquid specimens 12 or for rheometers 100 with various measurement system diameters, i.e. where the second measurement component 8, which is immersed into the specimen 12, has various diameters DM or external diameters.

Figure 4:
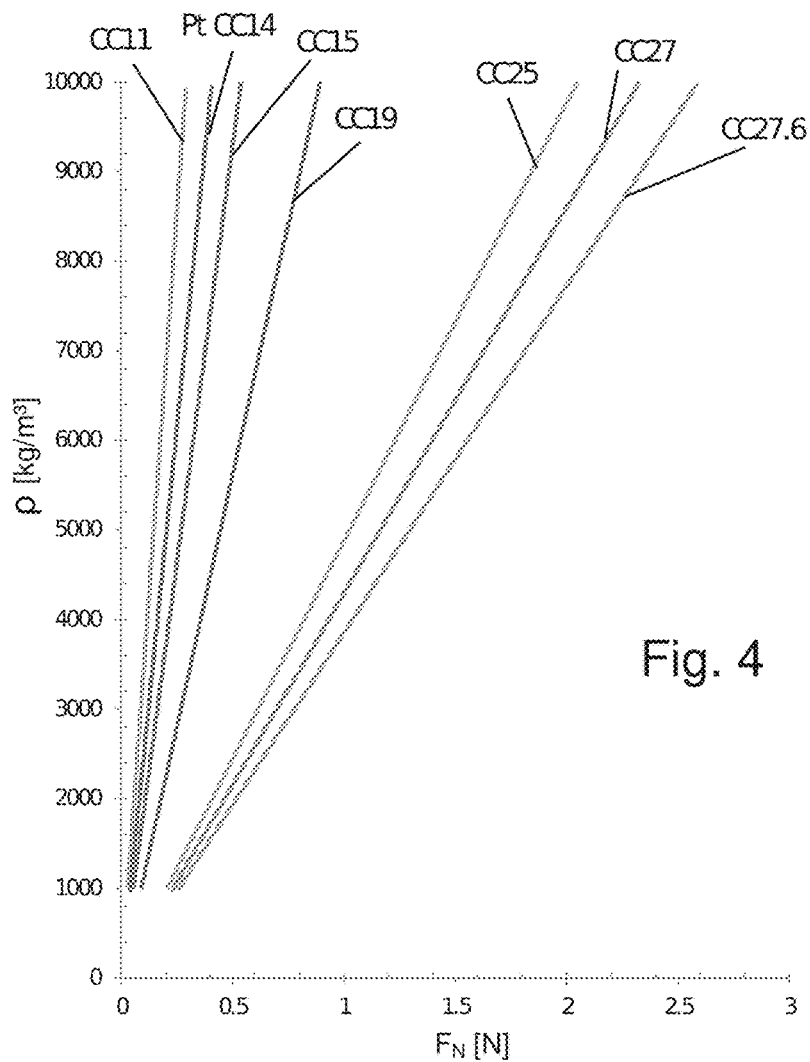
FIG. 4 is a diagram illustrating the relationship between the density of the specimen and measured normal force for rheometers with various measurement-component diameters.
Figure 5:
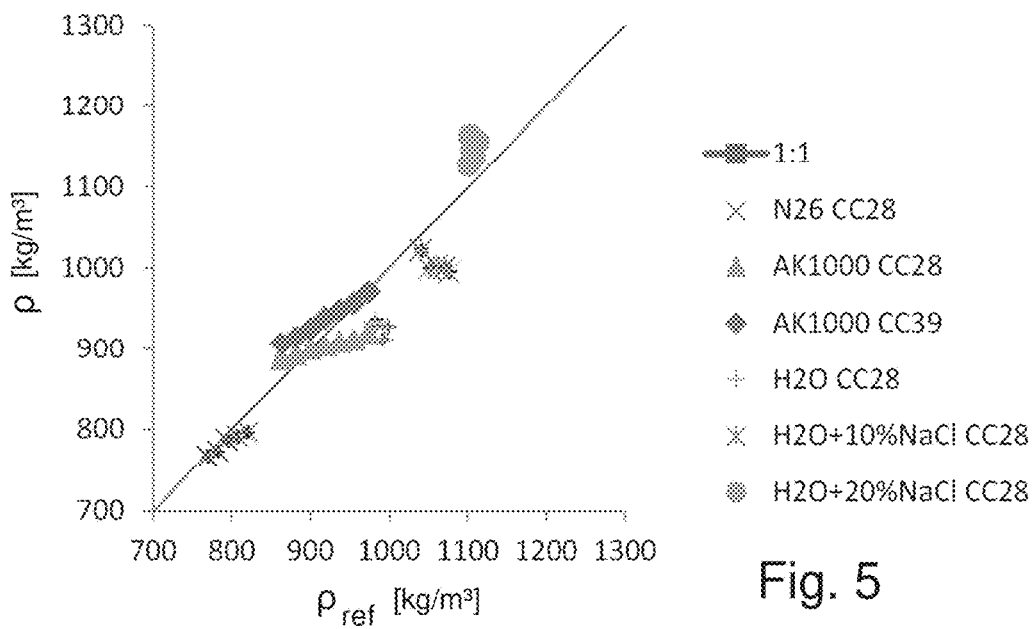
FIG. 5 is a diagram illustrating a comparison of the density determined in the invention for various specimens with reference values for the respective specimen.
Figure 7:
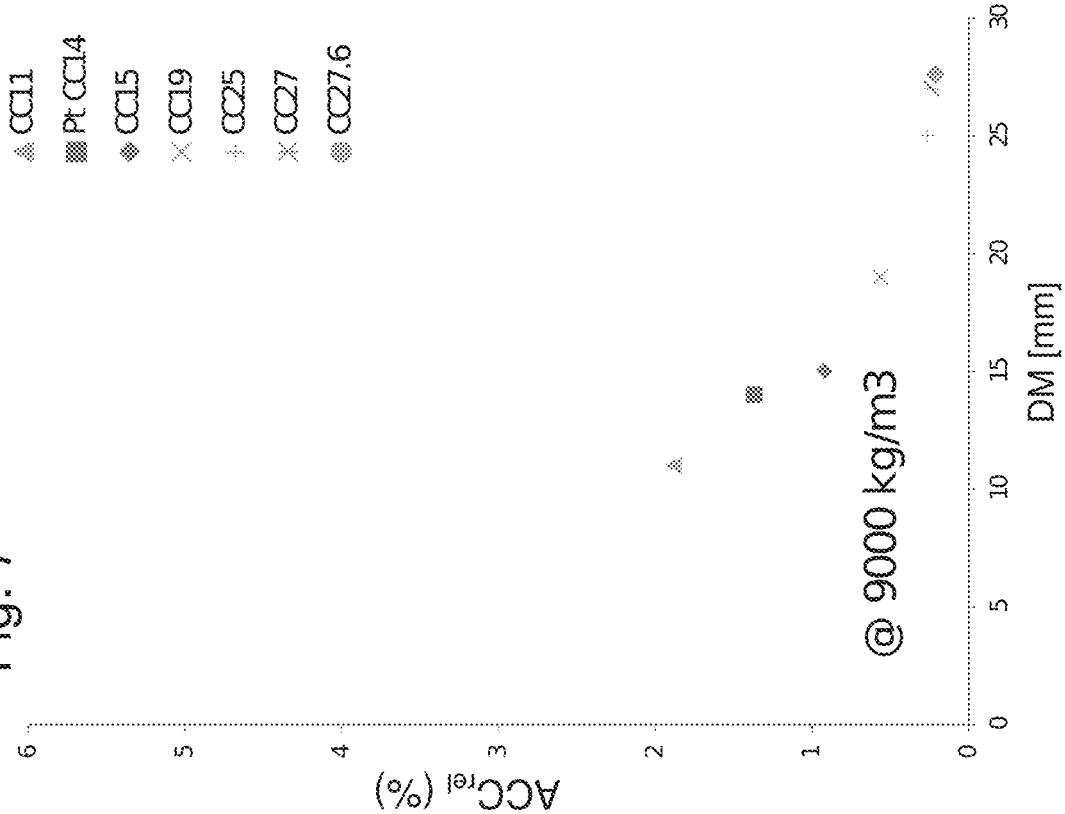
FIGS. 6 and 7 are diagrams illustrating the accuracy achieved in the density determined in the invention for the specimen for rheometers with various measurement-component diameters for various specimen densities.
Figure 6:
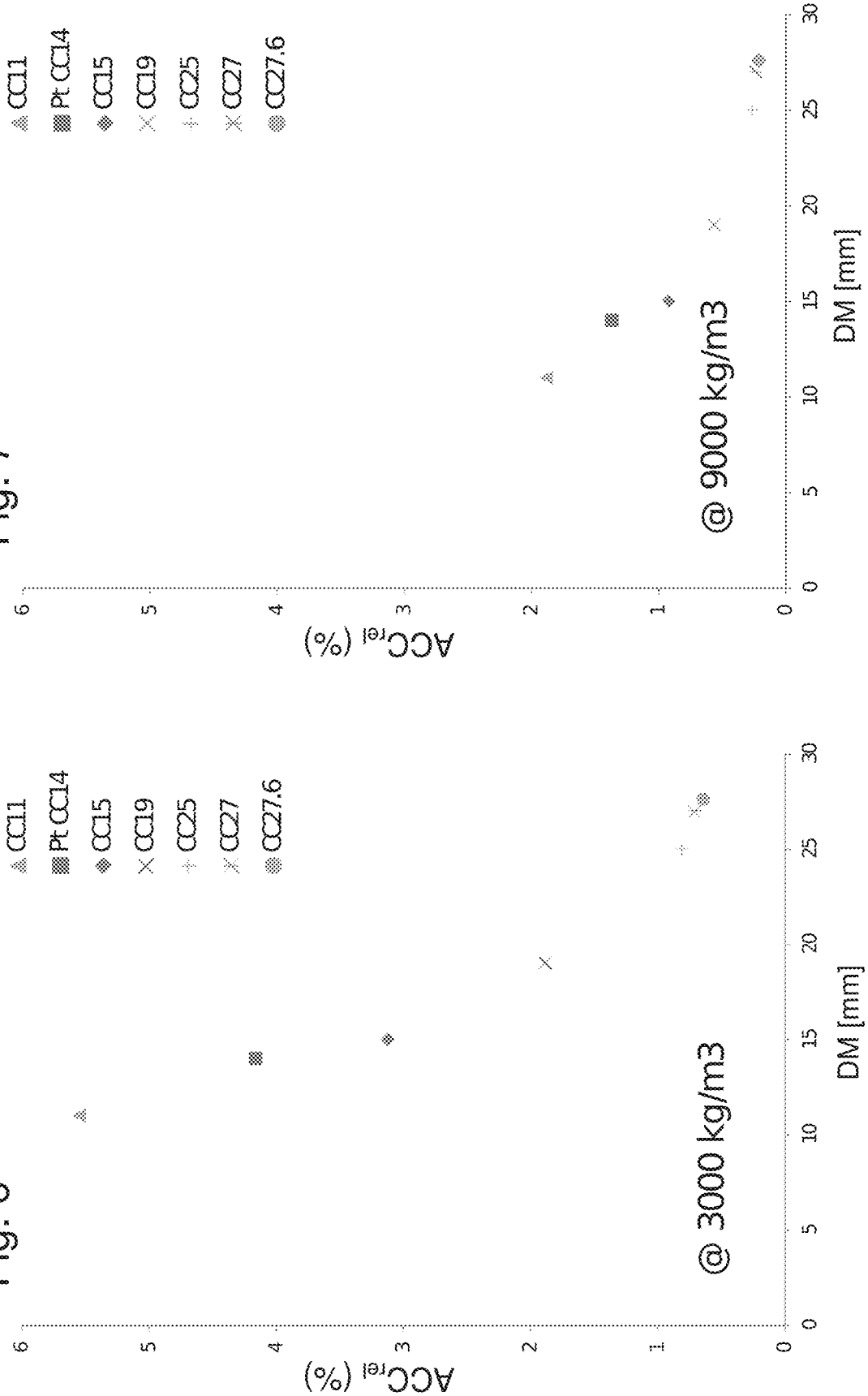

FIG. 4, FIG. 6 and FIG. 7 depict the general relationship between the measured normal force $F_N$ respectively stated in [N] and the density ρ of the test specimen 12 respectively stated in [kg/m$^3$] for rheometers 100 with various measurement system diameters. CC in FIG. 4 to FIG. 7 stands for concentric cylinder, i.e. rheometers 100 where the first measurement component 7 and the second measurement component 8 are configured as cylindrical measurement cup and measurement cylinder, disposed concentrically. The letters Pt stand for the material platinum or a platinum-rhodium alloy, and the diameters DM of the second measurement component 8 appear after the letters. The precise gap width 13 was selected here so as to avoid any influence on the measurement of the normal force $F_N$. The measurement-component diameters DM of the second measurement component 8 which are part of the rheometer names in FIG. 4, stated in [mm], can also be seen in FIG. 6 and FIG. 7.

As can be seen in FIG. 4, the measured normal force $F_N$ increases as density ρ of the specimen 12 increases. This relationship between the measured normal force $F_N$ and the density ρ of the test specimen 12 can be observed in all rheometers 100 independently of the measurement system diameter DM, where the measured normal force $F_N$ increases for a specimen 12 with a determined density, e.g. 2000 kg/m$^3$ with the diameter DM of the measurement system (imaginary horizontal line), i.e. is smaller in the case of smaller measurement system diameters (e.g. rheometers CC11, Pt CC14) than in the case of larger measurement system diameters (e.g. rheometers CC27, CC27.6).

The accuracy of each rheometer 100 and, respectively, of the associated measurement system was determined via calculation with the respective data. Smaller second measurement components 8 experience less buoyancy than large second measurement components 8. The difference in the normal force $F_N$ is therefore also very small, and relative accuracy in determination of the density ρ of the specimen 12 from the normal force $F_N$ decreases, as depicted for different specimen densities ρ in FIG. 6 and FIG. 7. In the case of all rheometers 100 and, respectively, all measurement systems, the density ρ of the specimen 12 can nevertheless be determined with sufficient accuracy from the measured normal force $F_N$ for the above-described reactions and temperature changes.

For the above, the minimum level of distinguishable percentage density differences was determined with the rheometer 100 with a cylinder of the stated size; this was achieved by relating the resolution available in the rheometer 100 to the measured normal forces $F_N$ and densities ρ.

In FIGS. 6 and 7, the abscissa shows the diameter DM of the second measurement component 8, and the ordinate shows the percentage accuracy (accuracy in relative terms). $ACC_{rel}$ of the density is shown here for various measurement body diameters. The values were determined from the normal force resolution of the rheometer 100 for the specified density values. When the diameter DM of the second measurement components 8 is selected to be sufficiently large for the initial density (e.g. CC27.6), the detectable change of density ρ is in the region below one percent. For the high-temperature measurement the resolution is 114 kg/m$^3$, for the MCR measurements with the CC28 it is 19 kg/m$^3$ and with the CC39 it is 7 kg/m$^3$.

FIG. 5 depicts measurement results for various test specimens 12 in comparison with density reference values Pref. The density reference values $ρ_{ref}$ of the test specimens 12 are plotted in [kg/m$^3$] on the abscissa here, while the values of the density ρ of the specimens 12 determined in the invention from the normal force $F_N$ and the known volume V of the second measurement component 8 are plotted in [kg/m$^3$] on the ordinate. Various liquids were tested: the specimen numbers N26 and AK1000 are silicone oils, H$_2$O is water and the specimens H$_2$O+10Gew % NaCl and H$_2$O+20Gew % NaCl are salt solutions. The specimens were respectively tested in a temperature range of −20° C. to 140° C. The temperature cannot be seen directly in FIG. 5, but the highest density ρ calculated for each substance in FIG. 5 is attributable to the lowest measurement temperature, whereas the respective lowest density ρ was calculated at the highest measurement temperature.

The tests summarized in FIG. 5 used two different measurement systems, which in FIG. 5 are termed CC28 (second measurement component 8 with a diameter DM of 28 mm) and CC39 (second measurement component 8 with a diameter DM of 39 mm). These measurement systems were selected in order to compensate the low densities ρ of the test specimens 12 over a relatively large volume V of the second measurement component 8 or of the measurement cylinder, and thus to generate sufficiently large normal forces $F_N$. With these measurement systems and, respectively, measurement system diameters DM it is also advantageously possible to achieve particularly precise determination of the densities ρ of specimens 12 whose densities ρ are lower than, for example, the extremely high densities of silicate melts.

In the case of silicate melts with their extremely high densities ρ, it is in contrast actually possible to use second components 8 with small diameters DM, as depicted in FIG. 6 and FIG. 7 (see, for example, CC11, Pt CC14 etc.).

The test procedures here were in each case in accordance with the following inventive scheme:
1) measurement of the input weight and determination of the specimen volume
2) introduction of the specimen 12 into the first measurement component 7 and incorporation of the measurement component 7 within the rheometer 100, or vice versa
3) immersion of the second measurement component 8 into the specimen 12
4) optionally temperature-control of the first measurement component 7 by use, for example, of a first measurement component 7 or measurement cup temperature-controlled by Peltier elements and waiting until the specimen 12 and the second measurement component 8 are in thermal equilibrium
5) measurement of the normal force $F_N$ after the immersion of the second measurement component 8 into the specimen 12
6) calculation of the density ρ of the specimen 12 by reference to the measured normal force $F_N$ and to the known volume of the second measurement component 8 in accordance with equation (3).

As already mentioned above, it is optionally possible that, after step 3), a determination of the position of the sample surface is carried out during the procedure of immersion of the second measurement component 8 and calculation of the geometric density $ρ_{Geo}$, in order to permit particularly precise density determination. In this case, the measurement of the normal force $F_N$ can be followed by a determination of the difference of the respective normal force value after the immersion of the second measurement component 8 from the initial value of the normal force $F_N$ during the procedure of immersion or immediately at the start of immersion, in order to calculate the density change from the change of normal force $F_N$.

With the CC28 measurement system, the normal forces $F_N$ are in the range between 0.2 and 0.3 N; with the CC39 measurement system they are higher by a factor of about 3, in the range between 0.7 and 0.8 N.

In accordance with the equations (1) to (3) presented above, the measured values (respectively 30 measured values averaged over 3 min) were compared with known density-reference values $\rho_{ref}$ for the abovementioned substances. These results are depicted in FIG. 5.

It was possible to characterize all liquids successfully in relation to resultant normal force $F_N$ after complete immersion. It is not surprising that density measurement was more difficult for specimens 12 with extremely high viscosities and also, respectively, when the specimen 12 had a large elastic component.

The substances used had viscosities in the range of <1 mPas to 100 Pas in the temperature range studied; this usefully represents the viscosity range of silicate (glass) melts, salt melts and metal melts.

The results in FIG. 5 show a systematic agreement between reference values and measured values, although in the case of all specimens 12 a certain drift occurs with temperature, because the thermal expansion of the second measurement component 8 or of the measurement body was not taken into account. This means that, even without taking the thermal expansion of the second measurement component 8 into account, the density $\rho$ of each test specimen 12 can be determined with sufficient precision by a method of the invention.

As already mentioned above, the accuracy of the calculated density $\rho$ can be increased if the thermal expansion of the second measurement component 8 is determined at various reference temperatures in advance, i.e. before tests relating to determination of the density $\rho$ of a specimen 12, and is stored in the control and processing unit, for example in the form of a volume-correction curve or volume-correction table. When the density $\rho$ of a specimen 12 is then determined, the influence of temperature on the volume V of the second measurement component 8 at the respective measurement temperature is already known, and this influence can then be corrected or taken into account by reference to the stored values during the calculation of density.

It is optionally possible, before tests relating to the determination of the density $\rho$ of a specimen 12 are carried out, to determine the influence of temperature not only on the volume V of the second measurement component 8 but also on the normal-force measurement at various reference temperatures, by making measurements of the density $\rho$ on reference liquids whose density $\rho$ at prescribed reference temperatures is known. In this case, the influence of temperature on the volume V of the second measurement component 8 and on the normal-force measurement can be stored in the control and processing unit, for example in the form of a combined normal-force-correction curve or normal-force-correction table, and this influence can then be corrected or taken into account by reference to the stored values during the calculation of density.

As can moreover be seen in FIG. 5, the measured values or density values are moreover very constant, and the standard deviation across the 30 measured values is depicted by way of an error bar which in each case is significantly smaller than the symbol size used.

The silicone oils do not evaporate within the temperature range used, and have comparatively low surface tensions (0.02 N/m), and measurements thereon can therefore be made with somewhat greater ease and, respectively, greater precision (deviation at most 5%, often only 1%).

As expected, water-based specimens in the vicinity of the boiling point exhibit somewhat greater scatter, because they begin to evaporate and are subject to somewhat greater error (at most 5-10% deviation) because their surface tension (0.06 N/m) is significantly higher than that of silicone oils. In the case of all specimens 12, it is nevertheless possible to achieve a sufficiently precise density determination by reference to a method of the invention.

The invention claimed is:

1. A method for determining the density of an at least flowable or liquid specimen, the method comprising:
   providing a rotational rheometer including a first measurement component for receiving the at least flowable or liquid specimen, and a second measurement component to be immersed into the specimen, the first measurement component and the second measurement component each having a bottom surface, the components being movable relative to one another and the second measurement component having a known volume;
   measuring a normal force acting in a direction normal to the rheometer between the bottom surfaces of each of the first and second measurement components after an immersion of the second measurement component into the specimen, the measured normal force corresponding to a buoyancy force acting between the specimen and the second measurement component; and
   calculating the density of the specimen based on Archimedes' principle by reference to the known volume of the second measurement component and to the measured normal force.

2. The method according to claim 1, which further comprises controlling a temperature of the specimen during the measurement of the normal force, and repeating a determination of the density of the specimen at different temperatures.

3. The method according to claim 2, which further comprises controlling the temperature of the specimen by at least one of heating up to a temperature of 1730° C. or cooling.

4. The method according to claim 1, which further comprises:
   before a determination of the density, determining a thermal expansion of the second measurement component at various reference temperatures and storing the thermal expansion; and
   during a following determination of the density of the specimen, at least one of correcting or taking into account an influence of temperature on the volume of the second measurement component at a respective measurement temperature by reference to stored values.

5. The method according to claim 4, which further comprises storing the thermal expansion as a volume-correction curve or volume-correction table.

6. The method according to claim 1, which further comprises:
   before the measurement of the density of the specimen, carrying out test measurements at various reference temperatures with reference liquids having a known density at prescribed reference temperatures, determining an influence of temperature on the volume of the second measurement component and on the normal-force measurement in combination and storing the influence; and
   during a following determination of the density of the specimen, correcting the influence of temperature on the volume of the second measurement component and on the measured normal force in combination at a respective measurement temperature by reference to stored values.

7. The method according to claim 6, which further comprises storing the influence as a normal-force-correction curve or normal-force-correction table.

8. The method according to claim 1, which further comprises:
before a determination of the density of the specimen:
calculating a geometric density at least of one reference liquid from a mass of a reference liquid introduced into the first measurement component and from a position, determined during an approach of the second measurement component, of a surface of the reference liquid, and from a known geometry of the first measurement component;
determining a density of the reference liquid, and determining a correction factor by a comparison of a determined value of the density of the reference liquid with a determined value of the geometric density of the reference liquid; and
during a following determination of the density of the specimen, correcting an effect of an immersion depth of the second measurement component into the specimen by reference to the determined correction factor.

9. The method according to claim 8, which further comprises calculating the geometric density of the at least one reference liquid at prescribed reference temperatures, determining the density of the reference liquid at the prescribed reference temperatures, storing the correction factor in an evaluation unit, and correcting the effect of the immersion depth at the respective measurement temperature.

10. The method according to claim 1, which further comprises:
keeping the first measurement component or the second measurement component stationary during the measurement of the normal force, or
at least one of rotationally oscillating or rotating the first measurement component or the second measurement component during the measurement of the normal force.

11. The method according to claim 1, which further comprises determining rheological parameters or viscosity of the specimen in addition to or simultaneously with a determination of the density of the specimen.

12. The method according to claim 1, which further comprises measuring a temperature of at least one of the specimen or the first measurement component or of the second measurement component, and not determining the density until the temperature of at least one of the specimen or the first measurement component or the second measurement component reaches a prescribed temperature-threshold value.

13. The method according to claim 1, which further comprises keeping a vertical distance between the first and second measurement components constant during the measurement of the normal force.

14. A rotational rheometer for determining the density of an at least flowable or liquid specimen, the rotational rheometer comprising:
a first measurement component for receiving the specimen and a second measurement component with a known volume, each of said components having a bottom surface, said second measurement component being disposed in said first measurement component for immersion into the specimen, and said first measurement component and said second measurement component being disposed in the rheometer for movement relative to one another;
a normal-force-measurement unit disposed and configured in the rheometer for measuring a force acting in a direction normal to the rheometer and acting on said bottom surface of each of said first and second measurement components before, during and after the immersion of said second measurement component into the specimen, the measured normal force of said immersed second measurement component corresponding to a buoyancy force acting between the specimen and said second measurement component; and
a control and processing unit configured to calculate the density of the specimen based on Archimedes' principle.

15. The rheometer according to claim 14, wherein:
said first measurement component is configured as a measurement cup with a cylindrical cross section;
said second measurement component is configured as a measurement body with a cylindrical cross section or as a rheological measurement spindle, said second measurement component has an external diameter being smaller than an internal diameter of said first measurement component; and
said first measurement component and said second measurement component are disposed coaxially in the rheometer for providing a measurement gap with a width between concentric walls of said first measurement component and of said second measurement component.

16. The rheometer according to claim 14, which further comprises at least one of a heating or cooling device for controlling a temperature of the flowable or liquid specimen, said at least one of a heating or cooling device being at least one of:
disposed in said first measurement component; or
at least one Peltier element; or
a temperature-control hood; or
disposed above said first and second measurement components; or
at least one of convection heating or convection cooling chambers controlling the temperature of said first or second measurement components or the specimen by using gases and fluids; or
a high-temperature oven receiving said first measurement component and said second measurement component.

17. The rheometer according to claim 16, wherein said control and processing unit is configured to control said at least one of a heating or cooling device.

18. The rheometer according to claim 14, which further comprises:
at least one measurement motor with a measurement shaft connected to said first measurement component or said second measurement component for setting said first or second measurement component in at least one of a rotating or oscillating motion relative to another of said first or second measurement component; and
said control and processing unit being configured to prescribe a rotation rate of said measurement motor and to at least one of measure a torque arising at said measurement shaft or prescribe a torque of said measurement motor and measure the rotation rate of said measurement motor.

19. The rheometer according to claim 18, wherein said control and processing unit is configured to evaluate, alone or simultaneously with a determination of the density of the specimen, measured values determined in relation to at least one of said measurement shaft or said measurement motor, and to determine at least one rheological parameter or viscosity of the specimen.

20. The rheometer according to claim 14, which further comprises:

a first measurement motor with a first measurement shaft connected to said first measurement component for setting said first measurement component in at least one of a rotating or oscillating motion;

a second measurement motor with a second measurement shaft connected to said second measurement component for setting said second measurement component in at least one of a rotating or oscillating motion, independently of said first measurement component; and said control and processing unit being configured to at least one of:

prescribe a rotation rate of at least one of said first measurement motor or said second measurement motor and to measure a torque arising at least one of at said first measurement shaft or at said second measurement shaft, or prescribe a torque of at least one of said first measurement motor or of said second measurement motor and measure the rotation rate of at least one of said first measurement motor or said second measurement motor.

21. The rheometer according to claim 20, wherein said control and processing unit is configured to evaluate, alone or simultaneously with a determination of the density of the specimen, measured values determined in relation to at least one of a respective one of said measurement shafts or a respective one of said measurement motors, and to determine at least one rheological parameter or viscosity of the specimen.

22. The rheometer according to claim 14, wherein said control and processing unit includes a memory unit and is configured to store, in said memory unit, at least one of a volume-correction curve or volume-correction table or normal-force-correction curve or normal-force-correction table.

23. The rheometer according to claim 14, wherein said normal-force-measurement unit is connected to said first measurement component and a further normal-force-measurement unit is connected to said second measurement component, said further normal-force-measurement unit is configured to measure, alone or simultaneously with said normal-force-measurement unit, the normal force between said first and second measurement components before, during and after the immersion of said second measurement component into the specimen.

* * * * *